(12) United States Patent
Tamura et al.

(10) Patent No.: US 8,320,109 B2
(45) Date of Patent: Nov. 27, 2012

(54) TELEVISION AND ELECTRONIC APPARATUS

(75) Inventors: Tomoaki Tamura, Ome (JP); Nobuyuki Hosoya, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/272,142

(22) Filed: Oct. 12, 2011

(65) Prior Publication Data

US 2012/0162952 A1   Jun. 28, 2012

(30) Foreign Application Priority Data

Dec. 27, 2010   (JP) .................................. 2010-291094

(51) Int. Cl.
  *H05K 5/00* (2006.01)
  *H05K 7/00* (2006.01)
(52) U.S. Cl. ......... 361/679.01; 361/679.02; 361/679.09; 361/679.21
(58) Field of Classification Search ............ 361/679.01–679.07, 679.3–679.39, 361/679.61, 796, 807–810
See application file for complete search history.

(56) References Cited

U.S. PATENT DOCUMENTS

| | | | | |
|---|---|---|---|---|
| 2003/0103173 A1* | 6/2003 | Satonaka | ......................... | 349/58 |
| 2007/0181456 A1 | 8/2007 | Kusuda et al. | | |
| 2009/0244025 A1 | 10/2009 | Hirota | | |
| 2009/0323264 A1* | 12/2009 | Eldershaw | ............... | 361/679.01 |
| 2010/0079698 A1 | 4/2010 | Matsumoto et al. | | |

FOREIGN PATENT DOCUMENTS

| | | |
|---|---|---|
| JP | U 03-60718 | 6/1991 |
| JP | H04-079302 U | 7/1992 |
| JP | 2001-183633 | 7/2001 |
| JP | 2002-132181 | 5/2002 |
| JP | 2003-233059 | 8/2003 |
| JP | 2005-077551 | 3/2005 |
| JP | 2008-209763 A | 9/2006 |
| JP | 2006-277739 A | 10/2006 |
| JP | 2008-102512 | 5/2008 |
| JP | 2009-053541 | 3/2009 |
| JP | 2009-128725 | 6/2009 |
| JP | 2009-181038 | 8/2009 |

(Continued)

OTHER PUBLICATIONS

Information Sheet for preparing an Information Disclosure Statement under Rule 1.56 (Concise Explanation of Relevance for JP U03-60718).

(Continued)

*Primary Examiner* — Tuan T Dinh
(74) *Attorney, Agent, or Firm* — Knobbe, Martens, Olson & Bear, LLP

(57) ABSTRACT

According to one embodiment, a television comprises a first panel, a second panel, and a cover. The first panel comprises a display surface. The second panel is laid over the first panel to cover the display surface. The cover comprises a receiver. A holding member is fixed to the edge of the second panel. The holding member comprises a protrusion protruding to the periphery of the second panel. The protrusion is butted against the receiver of the cover so that the second panel is tilted in a posture that slants the protrusion relative to the first panel. The second panel is rotated toward the first panel on the end of the protrusion butted against the receiver. As a result of this rotation, the second panel is stacked on the first panel to cover the display surface.

6 Claims, 10 Drawing Sheets

| | FOREIGN PATENT DOCUMENTS | |
|---|---|---|
| JP | 2009-244989 | 10/2009 |
| JP | 2010-020057 | 1/2010 |
| JP | 2010-078898 | 4/2010 |
| JP | 2010-134004 | 6/2010 |
| JP | 2010-134139 | 6/2010 |
| JP | 2010-145865 | 7/2010 |
| JP | 2011-133829 | 7/2011 |

OTHER PUBLICATIONS

Japanese Office Action dated Dec. 6, 2011 for Japanese Application No. 2010-291094 filed on Dec. 27, 2010.

* cited by examiner

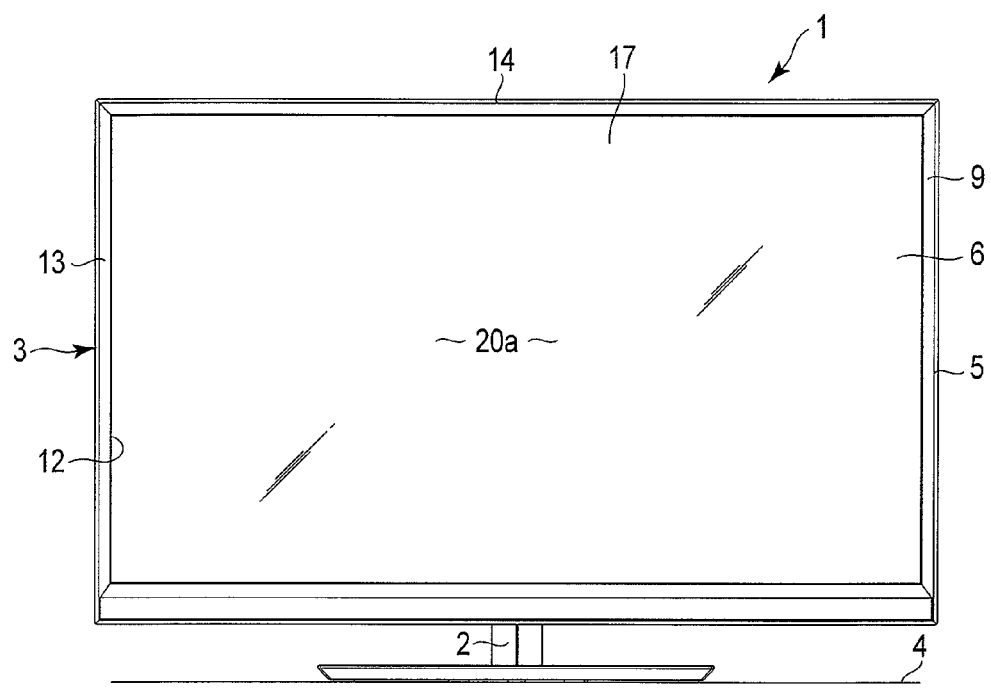
F I G. 1
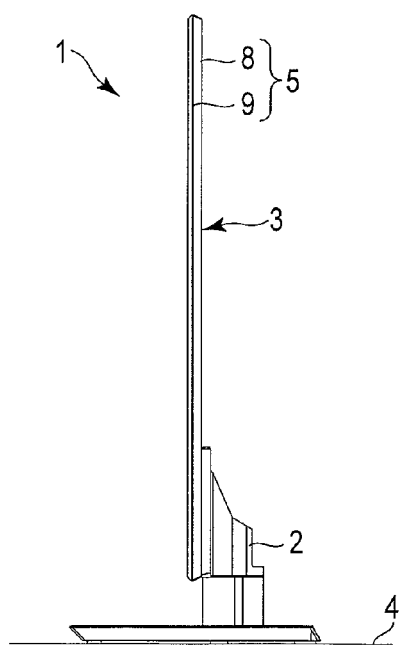
F I G. 2

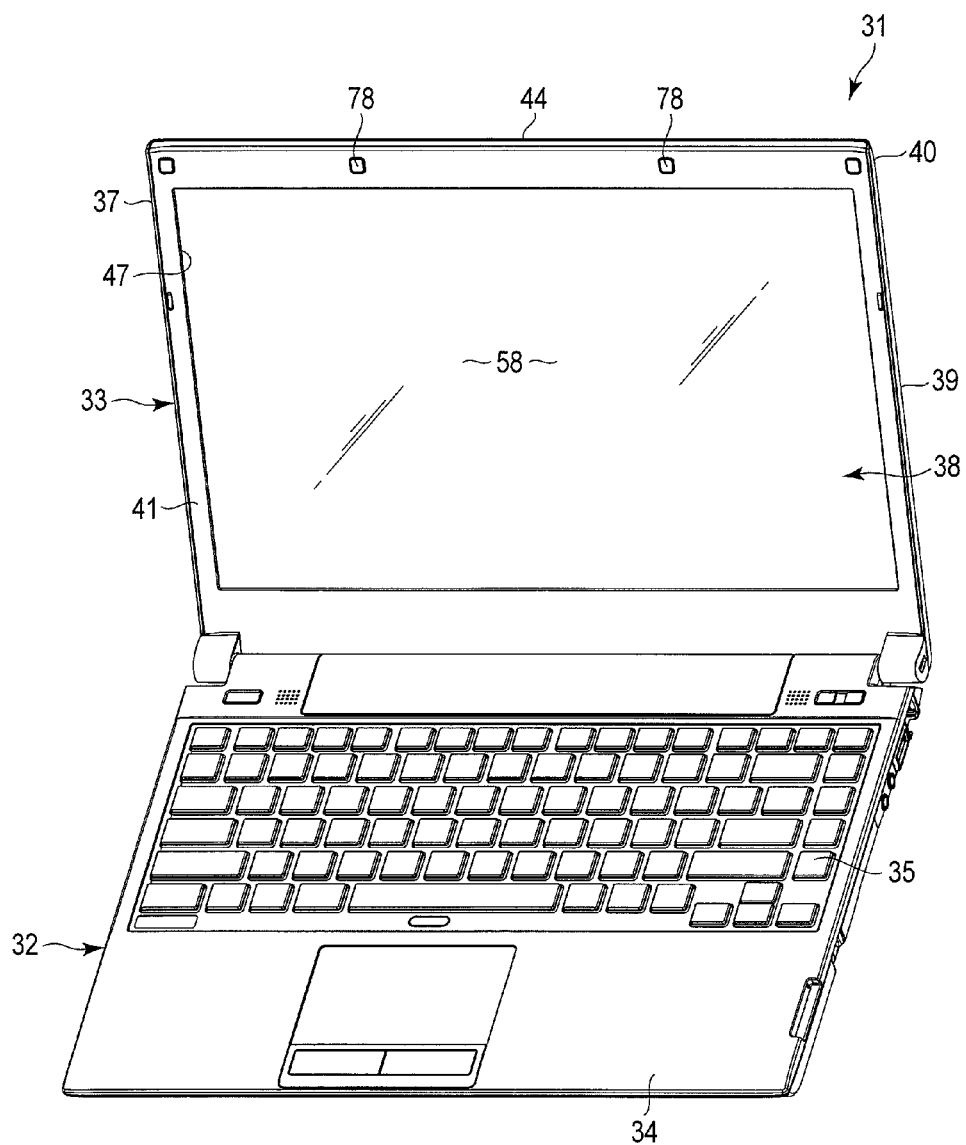
F I G. 5

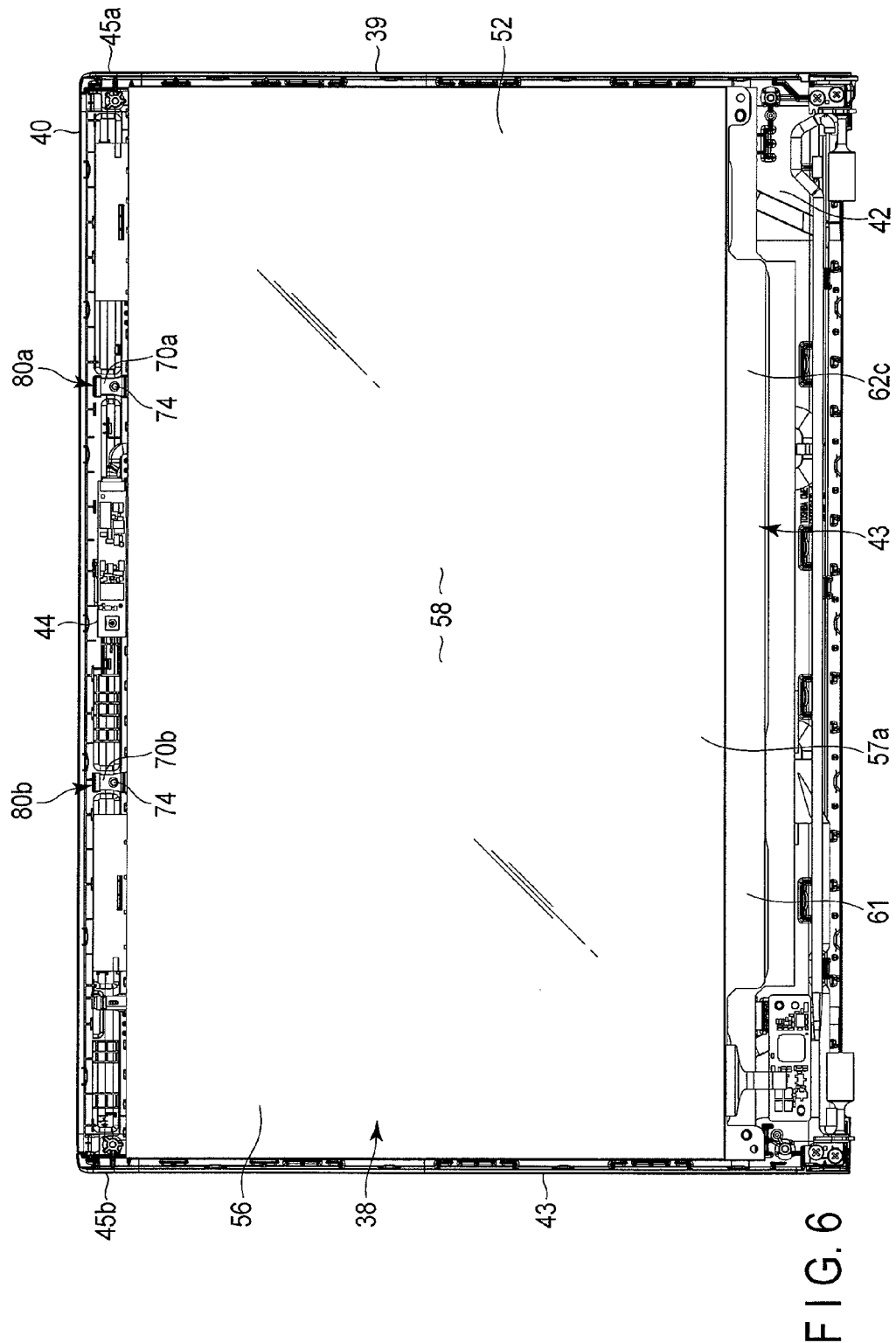
F I G. 6

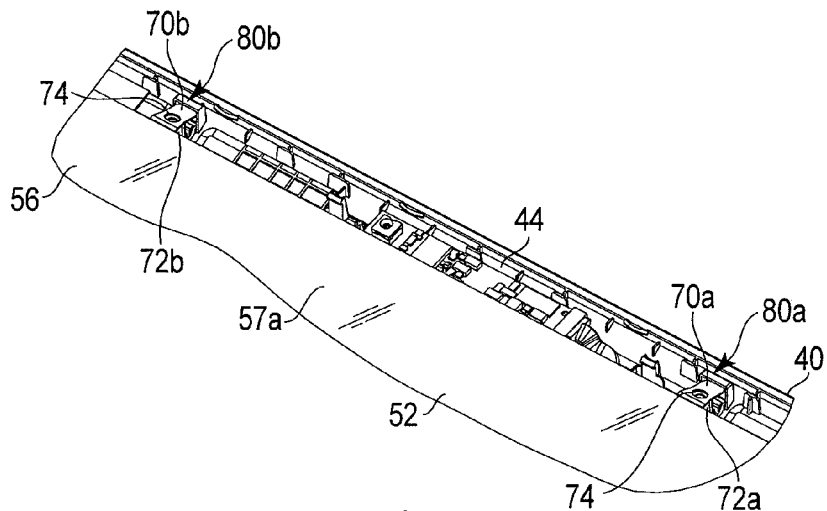
F I G. 11
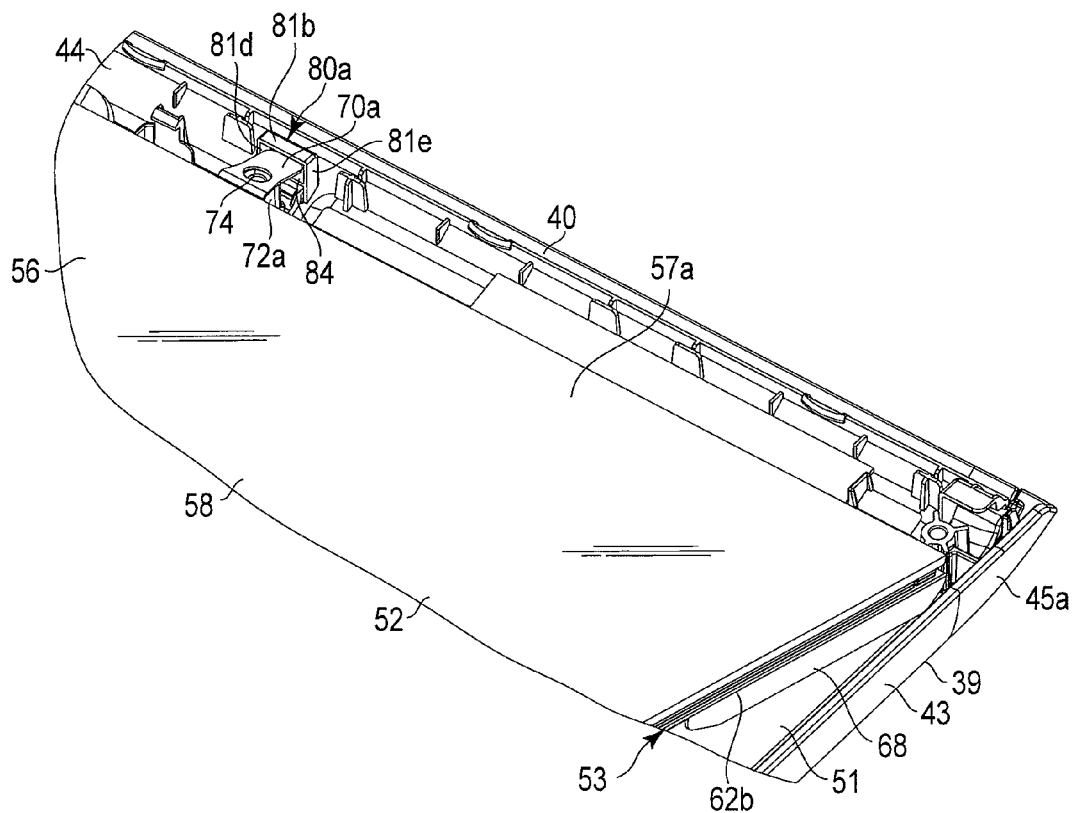
F I G. 12

TELEVISION AND ELECTRONIC APPARATUS

This application is based upon and claims the benefit of priority from prior Japanese Patent Application No. 2010-291094, filed Dec. 27, 2010, the entire contents of which are incorporated herein by reference.

FIELD

Embodiments described herein relate generally to a television and an electronic apparatus.

BACKGROUND

A television or an electronic apparatus having a handwritten character recognition function comprises an input panel such as a touch panel. The input panel is stacked on a liquid crystal display panel to cover a display surface of the liquid crystal display panel.

When laying the input panel over the liquid crystal display panel, an operator supplies compressed air to a space between the input panel and the liquid crystal display panel while holding the input panel with one hand. Thus, dust sticking to the input panel and the liquid crystal display panel is blown by the compressed air.

However, if the compressed air is blown to the input panel, the input panel is lifted in response to the pressure of the compressed air, and the posture of the input panel becomes unstable. This deteriorates workability when the input panel is laid over the liquid crystal display panel.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary front view of a liquid crystal television according to a first embodiment;

FIG. 2 is an exemplary side view of the liquid crystal television according to the first embodiment;

FIG. 5 is an exemplary perspective view of a portable computer according to a second embodiment;

FIG. 6 is an exemplary front view showing how a liquid crystal display device is mounted on a support wall of a back cover;

FIG. 11 is an exemplary enlarged perspective view showing a portion F11 in FIG. 8;

FIG. 12 is an exemplary perspective view showing how a protrusion of the holding member is inserted into a receiver of an antenna cover.

DETAILED DESCRIPTION

Various embodiments will be described hereinafter with reference to the accompanying drawings. In general, according to one embodiment, a television comprises a first panel, a second panel, and a cover. The first panel comprises a display surface. The second panel is laid over the first panel to cover the display surface. The cover comprises a receiver. A holding member is fixed to the edge of the second panel. The holding member comprises a protrusion protruding to the periphery of the second panel. The protrusion is butted against the receiver of the cover so that the second panel is tilted in a posture that slants the protrusion relative to the first panel. The second panel is rotated toward the first panel on the end of the protrusion butted against the receiver. As a result of this rotation, the second panel is stacked on the first panel to cover the display surface.

First Embodiment

A first embodiment is described below with reference to FIG. 1 to FIG. 4.

FIG. 1 and FIG. 2 show a liquid crystal television 1. The liquid crystal television 1 comprises a table stand 2 and a television body 3. The table stand 2 is placed on, for example, a placement surface of a television stand, and supports the television body 3.

Figure 3:
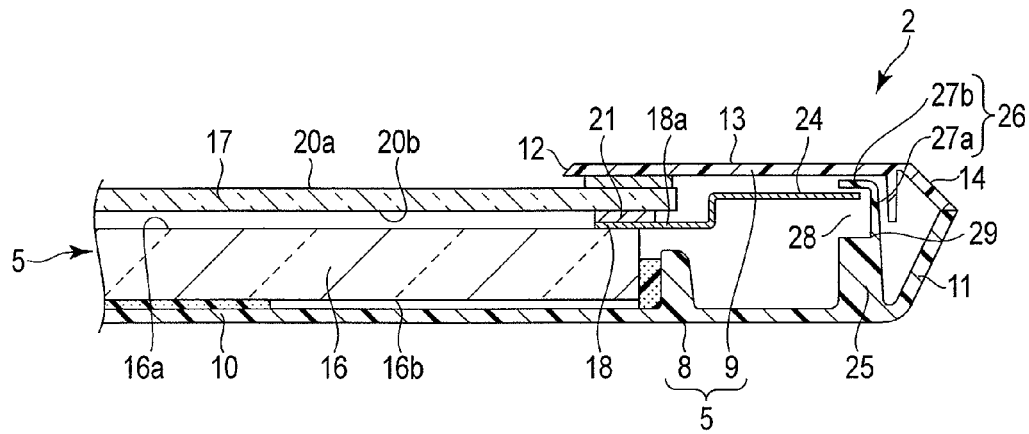
FIG. 3 is an exemplary sectional view of a television body of the liquid crystal television.

As shown in FIG. 3, the television body 3 comprises a housing 5, and a liquid crystal display device 6 having a handwritten character recognition function. The housing 5 comprises a back cover 8 and a front bezel 9. The back cover 8 has a square support wall 10, and a peripheral wall 11 rising from the outer peripheral edge of the support wall 10. The front bezel 9 is in the shape of a frame that defines a square opening 12. The front bezel 9 has a front wall 13 surrounding the opening 12, and a peripheral wall 14 rising from the outer peripheral edge of the front wall 13. The housing 5 is formed into a flat box shape by laying the front bezel 9 over the back cover 8 and butting the peripheral wall 11 of the back cover 8 and the peripheral wall 14 of the front bezel 9 against each other.

The liquid crystal display device 6 is housed in the housing 5. The liquid crystal display device 6 comprises a liquid crystal display panel 16, a touch panel 17, and a metal holding member 18. The liquid crystal display panel 16 is one example of a first panel, and is square. The liquid crystal display panel 16 has a display surface 16a for displaying images, and a back surface 16b located opposite to the display surface 16a. The liquid crystal display panel 16 is put inside the back cover 8 so that the back surface 16b faces the support wall 10 of the back cover 8.

The touch panel 17 is one example of a second panel. The touch panel 17 is in a square shape having about the same size as the liquid crystal display panel 16. Moreover, the touch panel 17 has a first surface 20a serving as an input surface, and a second surface 20b located opposite to the first surface 20a. The touch panel 17 is stacked on the liquid crystal display panel 16 to cover the display surface 16a of the liquid crystal display panel 16.

The holding member 18 is in a square shape formed along the outer peripheral edge of the touch panel 17. As shown in FIG. 3, the holding member 18 is fixed to, for example, the outer peripheral portion of the second surface 20b of the touch panel 17 via a double-sided adhesive tape 21. The holding member 18 intervenes between the outer peripheral portion of the display surface 16a of the liquid crystal display panel 16 and the outer peripheral portion of the second surface 20b of the touch panel 17.

The holding member 18 bonded to the touch panel 17 is fixed to the support wall 10 of the back cover 8 via screws. Moreover, the holding member 18 cooperates with the support wall 10 of the back cover 8 to hold the liquid crystal display panel 16 therebetween. As a result, the liquid crystal display panel 16 and the touch panel 17 are stacked on each other and supported on the support wall 10 of the back cover 8. The first surface 20a of the touch panel 17 is exposed to the outside of the housing 5 from the opening 12 of the front bezel 9.

As shown in FIG. 3, the holding member 18 has one side 18a. The side 18a extends in the width direction of the touch panel 17. A pair of protrusions 24 (one protrusion alone is shown) is formed integrally with the side 18a of the holding member 18. The protrusions 24 protrude from the side 18a of the holding member 18 to the periphery of the touch panel 17, and are apart from each other in the width direction of the touch panel 17. Moreover, the protrusions 24 intervene between the outer peripheral portion of the support wall 10 of the back cover 8 and the front wall 13 of the front bezel 9.

The support wall 10 of the back cover 8 has a pair of bosses 25 (one boss alone is shown). The bosses 25 protrude toward the front wall 13 of the front bezel 9 from the outer peripheral portion of the inner surface of the support wall 10 around the liquid crystal display panel 16. A receiver 26 is integrally formed in the end face of each of the bosses 25.

The receiver 26 has a first wall 27a and a second wall 27b. The first wall 27a stands from the end face of the boss 25 toward the front bezel 9. The first wall 27a has a predetermined width dimension along the width direction of the touch panel 17. The second wall 27b integrally extends from the end of the first wall 27a toward the touch panel 17. In other words, the second wall 27b extends in a direction that intersects with the first wall 27a to face the end face of the boss 25. Thus, a clearance 28 is formed between the end face of the boss 25 and the second wall 27b. The clearance 28 is open toward the liquid crystal display device 6.

Figure 4:
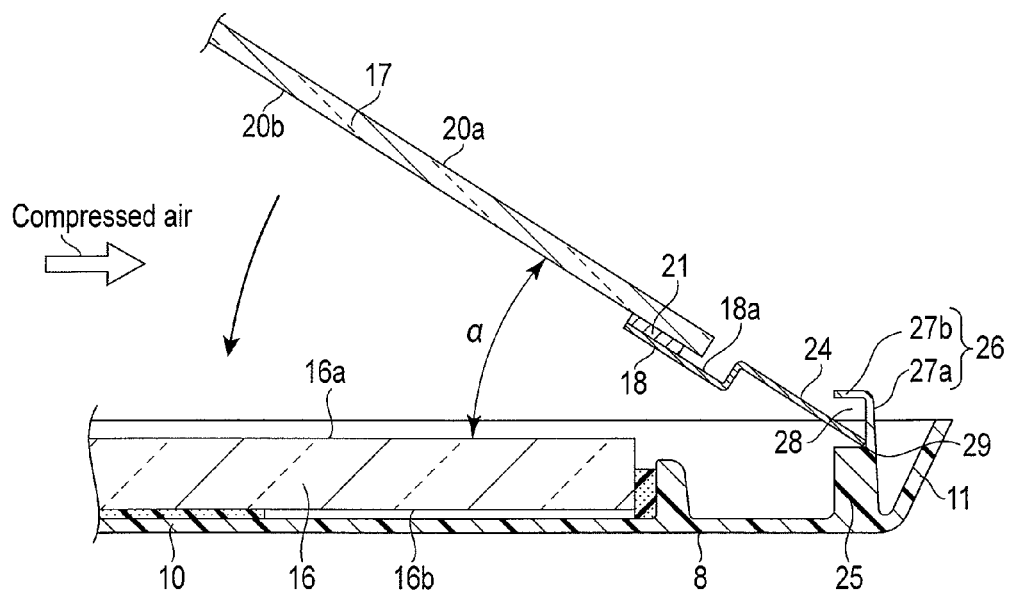
FIG. 4 is an exemplary sectional view showing how a touch panel is tilted relative to a liquid crystal display panel and the end of a protrusion of a holding member is butted against a receiver.

Now, a procedure of assembling the television body 3 is described together with FIG. 4.

First, the back cover 8 is horizontally held so that the inner surface of the support wall 10 of the back cover 8 faces upward. In this condition, the liquid crystal display panel 16 is placed in a predetermined position of the inner surface of the support wall 10.

Furthermore, the procedure moves to the work of laying, over the liquid crystal display panel 16, the touch panel 17 to which the holding member 18 is bonded. In this case, an operator tilts the touch panel 17 so that the protrusions 24 of the holding member 18 are obliquely downward relative to the liquid crystal display panel 16, and the operator also butts the ends of the protrusions 24 against the receivers 26.

More specifically, as shown in FIG. 4, the operator inserts the end of the protrusion 24 into the clearance 28 between the end face of the boss 25 and the second wall 27b while tilting the touch panel 17 relative to the liquid crystal display panel 16. At the same time, the operator butts the end of the protrusion 24 against a corner 29 defined by the end face of the boss 25 and the first wall 27a. As a result, the touch panel 17 is temporarily held by the back cover 8, and a tilt angle α of the touch panel 17 relative to the liquid crystal display panel 16 is determined.

Furthermore, the operator holds the touch panel 17 with one hand to hold the touch panel 17 tilted. The operator also holds an air nozzle with the other hand, and uses the air nozzle to supply compressed air which is one example of a gas to a region between the liquid crystal display panel 16 and the touch panel 17. The tilt angle α of the touch panel 17 is desirably an angle that allows the compressed air to be easily blown to both the liquid crystal display panel 16 and the touch panel 17. By blowing the compressed air to the liquid crystal display panel 16 and the touch panel 17, dust in the air sticking to the liquid crystal display panel 16 and the touch panel 17 is removed.

Furthermore, the operator rotates the touch panel 17 toward the liquid crystal display panel 16 on the ends of the protrusions 24 butted against the receivers 26 while blowing the compressed air to the liquid crystal display panel 16 and the touch panel 17. As a result of this rotation, the touch panel 17 is stacked on the liquid crystal display panel 16 to cover the display surface 16a of the liquid crystal display panel 16.

While the touch panel 17 is stacked on the liquid crystal display panel 16, the operator fixes the holding member 18 to the support wall 10 of the back cover 8. Finally, the operator lays the front bezel 9 over the back cover 8.

According to the first embodiment, the ends of the protrusions 24 protruding from the side 18a of the holding member 18 are butted against the receivers 26 of the back cover 8 such that the touch panel 17 is temporarily fastened to the back cover 8. Thus, the touch panel 17 can be easily held tilted relative to the liquid crystal display panel 16.

Consequently, even if the compressed air is supplied to the region between the touch panel 17 and the liquid crystal display panel 16 when the touch panel 17 is laid over the liquid crystal display panel 16, it is possible to prevent the touch panel 17 from being lifted or wobbling in response to the pressure of the compressed air.

In addition, when the ends of the protrusions 24 are butted against the receivers 26, the second walls 27b of the receivers 26 project over the ends of the protrusions 24. Therefore, even if the touch panel 17 is lifted by the compressed air, the second walls 27b are butted against the ends of the protrusions 24, thereby preventing the lifting of the touch panel 17.

As a result, the posture of the touch panel 17 is stabilized, and the work of blowing the compressed air to the touch panel 17 and the liquid crystal display panel 16 can be easily carried out.

In addition, the ends of the protrusions 24 butted against the receivers 26 serve as pivots on which the touch panel 17 is rotated toward the liquid crystal display panel 16. Thus, the touch panel 17 can be rotated on a stable track without wobbling. Consequently, the work of laying the touch panel 17 over the liquid crystal display panel 16 while blowing dust with the compressed air can be easily carried out.

Although the liquid crystal display panel is used as the first panel in the first embodiment, other panels such as an organic EL panel may be used instead of the liquid crystal display panel.

Moreover, the second panel laid over the liquid crystal display panel is not exclusively the touch panel. For example, a transparent protective plate or a privacy filter for protecting the display surface of the liquid crystal display panel may be used as the second panel.

Second Embodiment

FIG. 5 to FIG. 13 disclose a second embodiment.

FIG. 5 discloses a portable computer 31 which is one example of an electronic apparatus. The portable computer 31 comprises a main module 32, and a display module 33.

The main module 32 comprises a flat box-shaped first housing 34. The first housing 34 houses primary elements such as a motherboard equipped with a CPU and a hard disk drive. A keyboard 35 is placed on the upper surface of the first housing 34.

Figure 7:
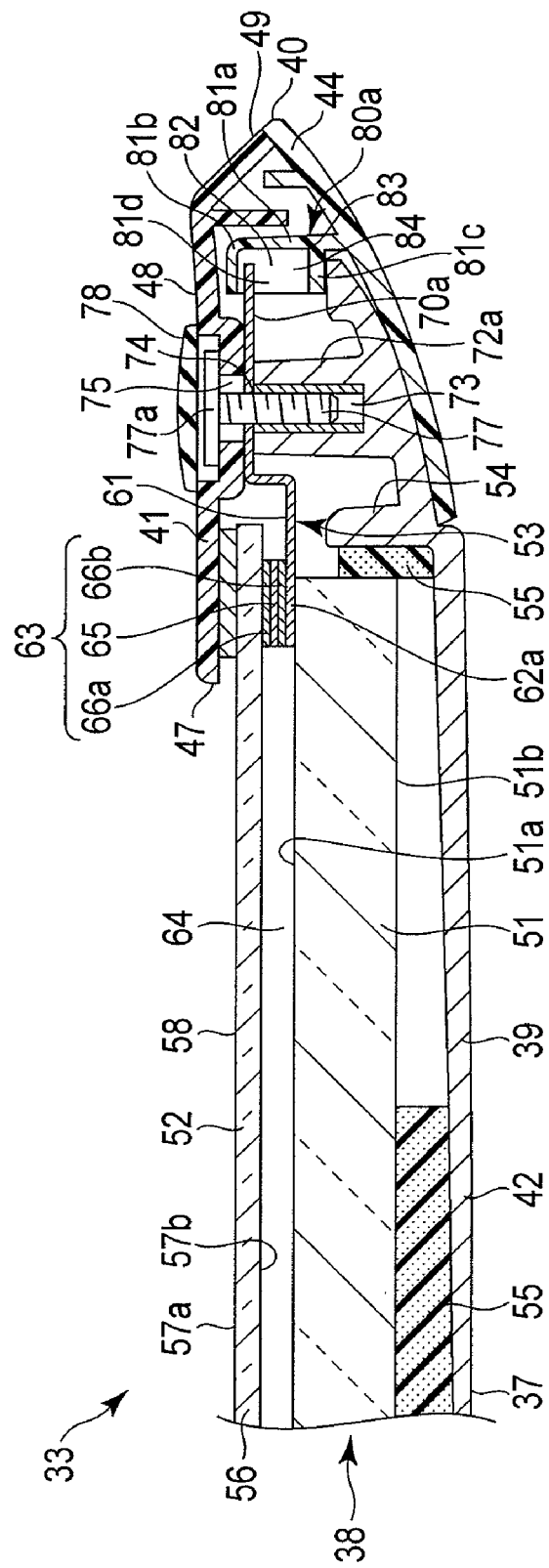
FIG. 7 is an exemplary sectional view of a display module.

The display module 33 is rotatably supported on the rear end of the main module 32. As shown in FIG. 7, the display module 33 comprises a second housing 37 and a liquid crystal display device 38. The second housing 37 comprises a back cover 39, an antenna cover 40, and a front cover 41.

Figure 8:
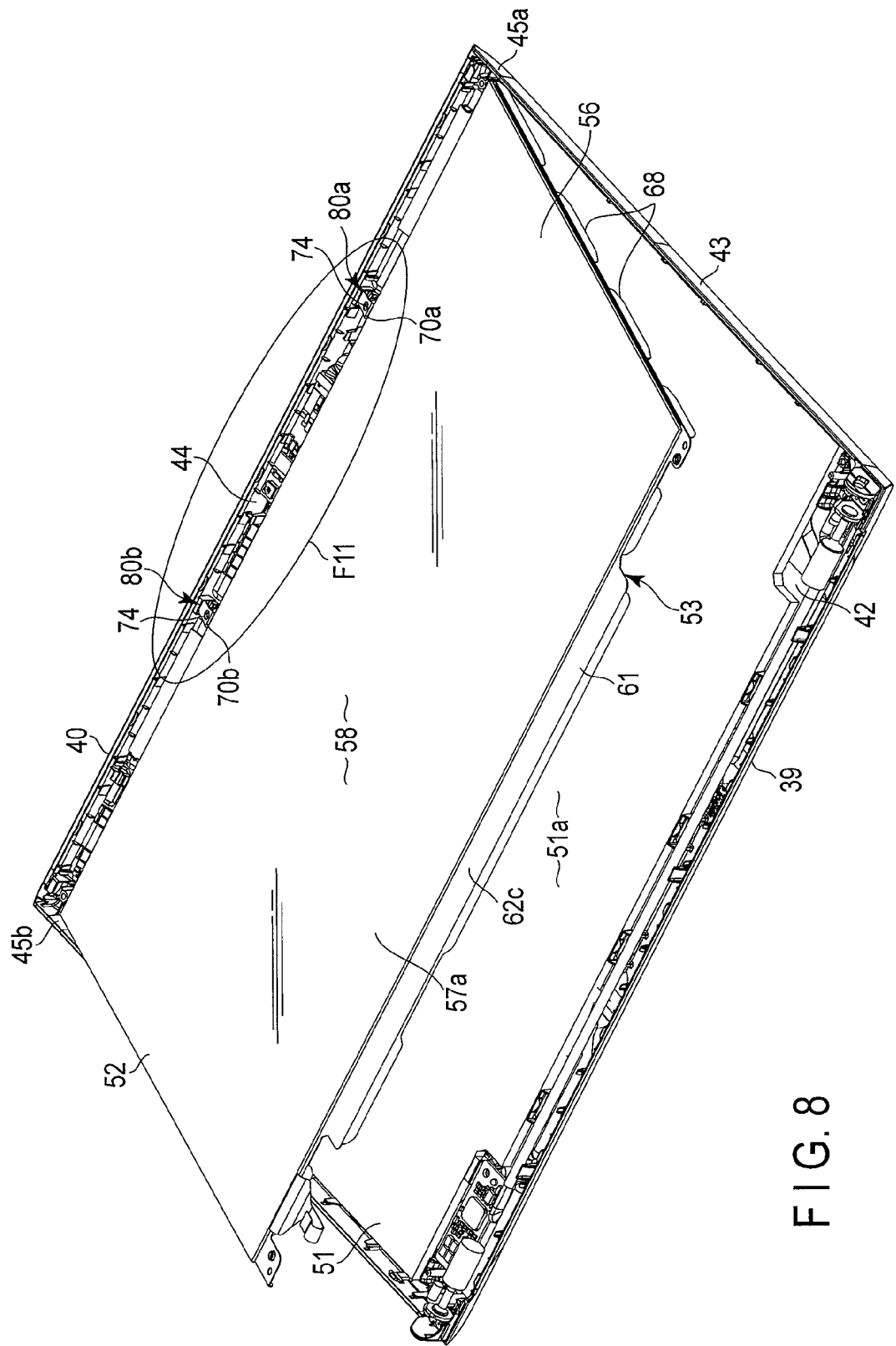
FIG. 8 is an exemplary perspective view showing how a touch panel is tilted relative to a liquid crystal display panel mounted on the back cover.

The back cover 39 is injection-molded by a metal material such as a magnesium alloy. As shown in FIG. 6 to FIG. 8, the back cover 39 has a square support wall 42, and a peripheral wall 43 rising from a left edge, a right edge and a lower edge of the support wall 42.

The antenna cover 40 is injection-molded by a synthetic resin material. The antenna cover 40 is attached to the outer peripheral surface of the upper edge of the support wall 42, and extends in the width direction of the back cover 39. The antenna cover 40 has an extension 44, a first side wall 45a, and a second side wall 45b. The extension 44 projects from the upper edge of the support wall 42 of the back cover 39 to the periphery of the support wall 42, and extends in the width direction of the back cover 39. The first side wall 45a and the second side wall 45b stand from the right edge and left edge of the extension 44 to continue to the peripheral wall 43 of the back cover 39.

The front cover 41 is injection-molded by, for example, a synthetic resin material. The front cover 41 is in the shape of a frame that defines a square opening 47. The front cover 41 has a front wall 48 surrounding the opening 47, and a peripheral wall 49 rising from the outer peripheral edge of the front wall 48.

The second housing 37 is formed into a flat box shape by laying the front cover 41 over the back cover 39 and butting the peripheral wall 43 of the back cover 39 and the peripheral wall 49 of the front cover 41 against each other. Moreover, the end of the extension 44 of the antenna cover 40, the first side wall 45a, and the second side wall 45b continue to the peripheral wall 49 of the front cover 41.

The liquid crystal display device 38 is housed in the second housing 37. The liquid crystal display device 38 comprises a liquid crystal display panel 51, a touch panel 52, and a holding member 53. The liquid crystal display panel 51 is one example of a first panel, and is square. The liquid crystal display panel 51 has a display surface 51a for displaying images, and a back surface 51b located opposite to the display surface 51a. The liquid crystal display panel 51 is put inside the back cover 39 so that the back surface 51b faces the support wall 42 of the back cover 39.

Standing walls 54 protrude from the inner surface of the support wall 42. The standing walls 54 are located around the liquid crystal display panel 51. In the second embodiment, sponge-like cushion materials 55 for receiving the liquid crystal display panel 51 are affixed to the inner surface of the support wall 42 and the side surfaces of the standing walls 54, respectively.

The touch panel 52 is one example of a second panel. The touch panel 52 comprises a transparent substrate 56 provided with an unshown transparent electrode. The transparent substrate 56 is in a square shape that is a size larger than the liquid crystal display panel 51.

Moreover, the transparent substrate 56 has a first surface 57a serving as an input surface, and a second surface 57b located opposite to the first surface 57a. A square input region 58 is defined on the first surface 57a of the transparent substrate 56. The input region 58 is a region to perform input operation by touching with, for example, a stylus. The input region 58 accounts for a large percentage of the first surface 57a except for the outer peripheral part of the first surface 57a.

The touch panel 52 is stacked on the liquid crystal display panel 51 to cover the display surface 51a of the liquid crystal display panel 51. Thus, the second surface 57b of the touch panel 52 faces the display surface 51a of the liquid crystal display panel 51.

Figure 9:
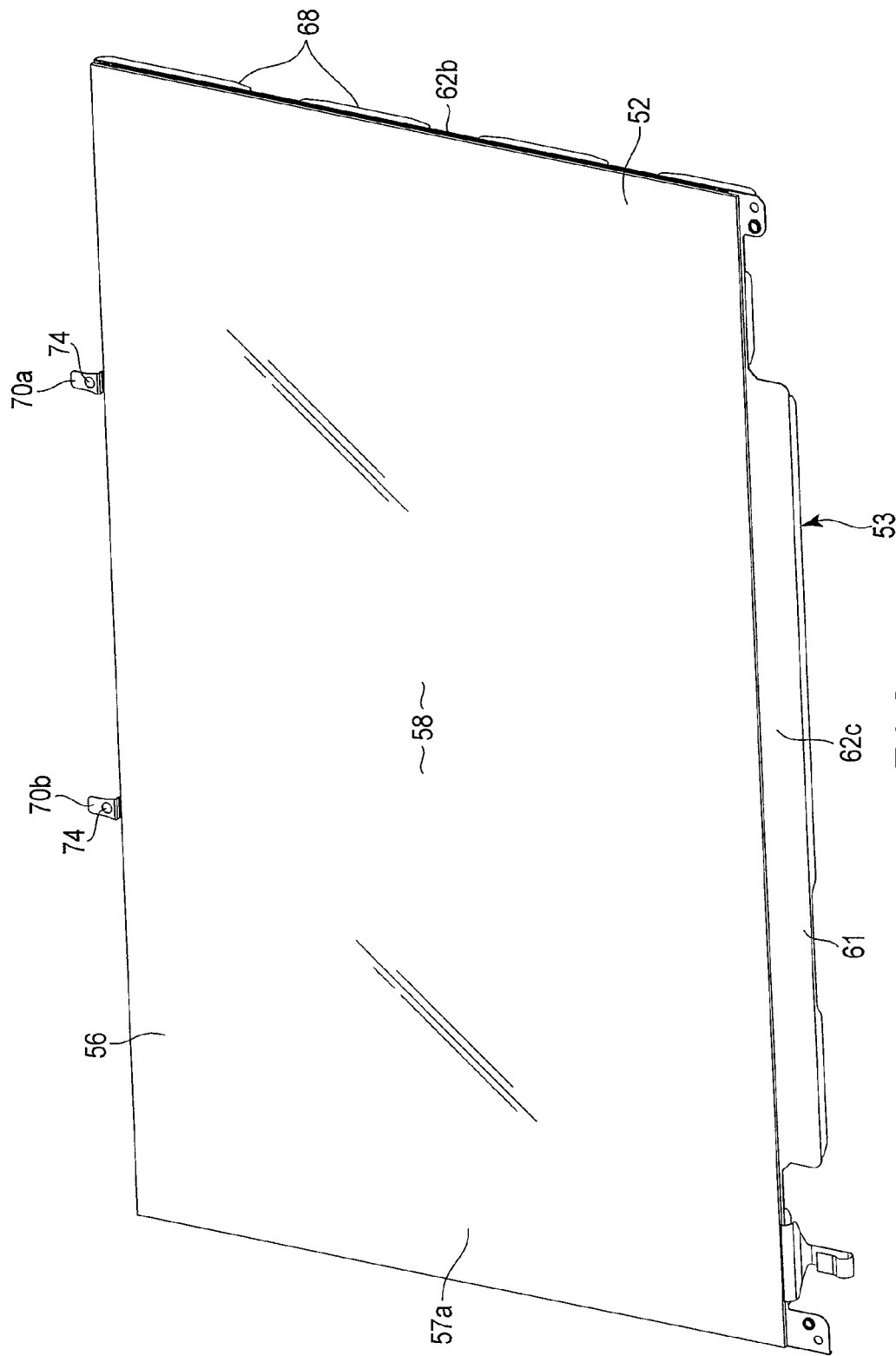
FIG. 9 is an exemplary perspective view showing, from the direction of a first surface, the touch panel to which a holding member is fixed.
Figure 10:
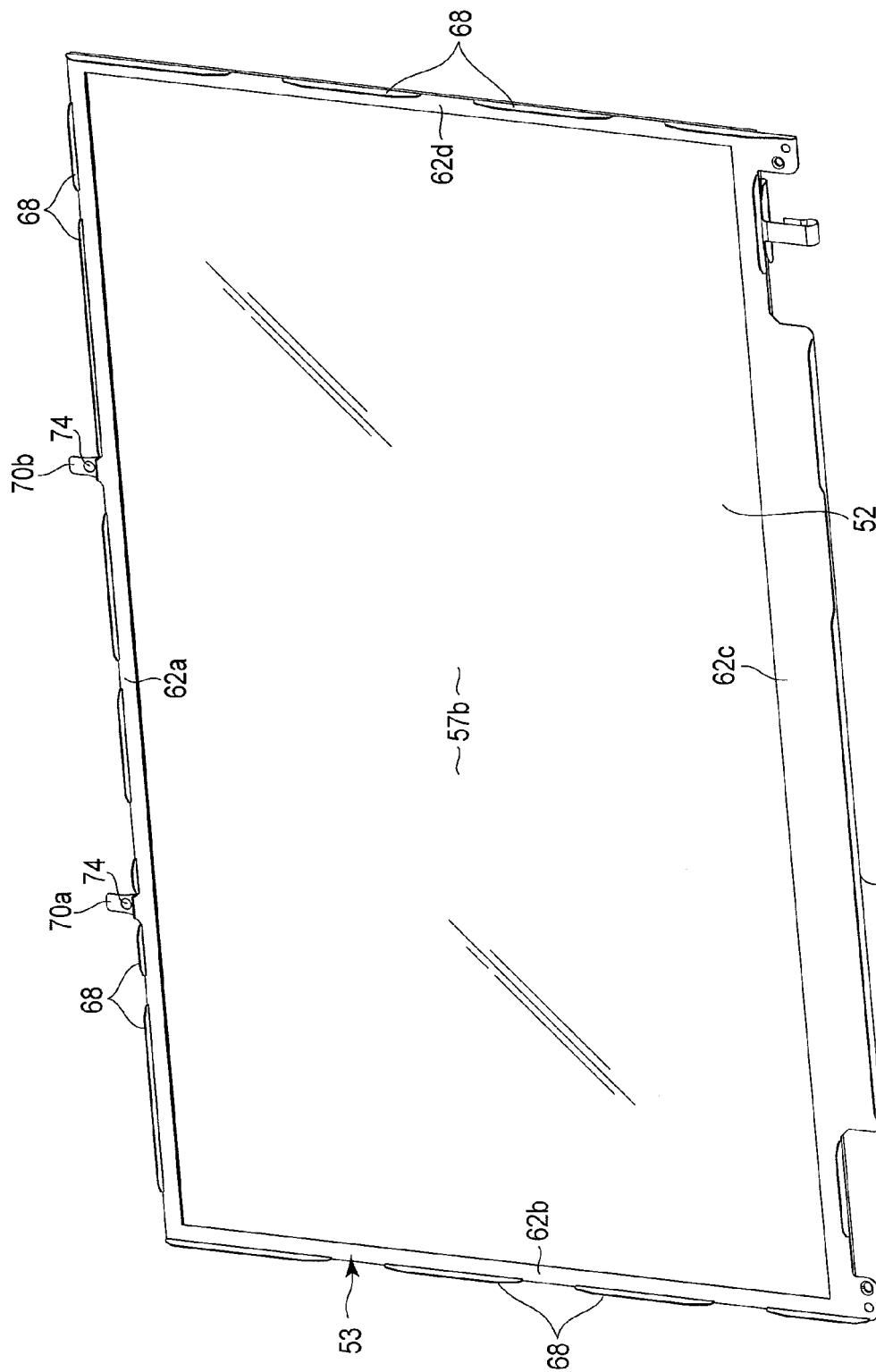
FIG. 10 is an exemplary perspective view showing, from the direction of a second surface, the touch panel to which the holding member is fixed.

As shown in FIG. 9 and FIG. 10, the holding member 53 comprises a metal body 61. The body 61 is in a square frame shape formed along the outer peripheral edge of the transparent substrate 56, and has first to fourth sides 62a, 62b, 62c, and 62d. The first to fourth sides 62a, 62b, 62c, and 62d linearly extend along four edges of the transparent substrate 56, respectively.

More specifically, the first side 62a and the third side 62c extend along the upper edge and lower edge of the transparent substrate 56 in the width direction of the transparent substrate 56. The second side 62b and the fourth side 62d extend along the side edges of the transparent substrate 56 in the height direction of the transparent substrate 56.

The first to fourth sides 62a, 62b, 62c, and 62d of the body 61 are fixed to the outer peripheral portion of the second surface 57b of the transparent substrate 56 via a double-sided adhesive tape 63 shown in FIG. 7, respectively. The body 61 surrounds the input region 58 from the direction of the second surface 57b of the transparent substrate 56.

The body 61 intervenes between the outer peripheral portion of the display surface 51a of the liquid crystal display panel 51 and the outer peripheral portion of the second surface 57b of the transparent substrate 56. As a result, a clearance 64 for absorbing the bending of the touch panel 52 is provided between the display surface 51a of the liquid crystal display panel 51 and the second surface 57b of the transparent substrate 56.

According to the second embodiment, the double-sided adhesive tape 63 has a three-layer structure having an insulator layer 65, a first adhesive layer 66a, and a second adhesive layer 66b. The insulator layer 65 is an element serving as a core of the double-sided adhesive tape 63, and is belt-shaped. The first adhesive layer 66a is stacked on the front surface of the insulator layer 65. The second adhesive layer 66b is stacked on the rear surface of the insulator layer 65. Therefore, the size of the clearance 64 between the liquid crystal display panel 51 and the touch panel 52 can be adjusted by changing the thickness of the insulator layer 65.

As shown in FIG. 8 to FIG. 10, engaging strips 68 are integrally formed on the outer peripheral edges of the first side 62a, the second side 62b, and the fourth side 62d of the holding member 53. The engaging strips 68 are bent at right angles toward the liquid crystal display panel 51 from the outer peripheral edges of the first side 62a, the second side 62b and the fourth side 62d.

Moreover, the engaging strips 68 are arranged at intervals in the longitudinal directions of the first side 62a, the second side 62b and the fourth side 62d. When the touch panel 52 is stacked on the liquid crystal display panel 51, the engaging strips 68 relatively position the liquid crystal display panel 51 and the touch panel 52.

As shown in FIG. 10, first and second protrusions 70*a* and 70*b* are integrally formed on the first side 62*a* of the holding member 53. The first protrusion 70*a* and the second protrusion 70*b* are apart from each other in the longitudinal direction of the first side 62*a*, and project from the first side 62*a* to the periphery of the touch panel 52.

In the second embodiment, the first protrusion 70*a* is shifted from the corner of the body 61 defined by the first side 62*a* and the second side 62*b* toward the longitudinal center of the first side 62*a*. Likewise, the second protrusion 70*b* is shifted from the corner of the body 61 defined by the first side 62*a* and the fourth side 62*d* toward the longitudinal center of the of the first side 62*a*. As shown in FIG. 7, the first and second protrusions 70*a* and 70*b* intervene between the outer peripheral portion of the support wall 42 of the back cover 39 and the front wall 48 of the front cover 41 around the touch panel 52.

As shown in FIG. 7 and FIG. 11, the support wall 42 of the back cover 39 has a pair of seats 72*a* and 72*b*. The seats 72*a* and 72*b* protrude at positions corresponding to the first and second protrusions 70*a* and 70*b* of the holding member 53 from the inner surface of the outer peripheral portion of the support wall 42 toward the front wall 48 of the front cover 41. The seats 72*a* and 72*b* have screw holes 73, respectively. The screw holes 73 are open in the end faces of the seats 72*a* and 72*b*.

FIG. 7 discloses the positional relation between the first protrusion 70*a* of the holding member 53, the seat 72*a*, and the front wall 48 of the front cover 41. The first protrusion 70*a* of the holding member 53 intervenes between the end face of the seat 72*a* and the front wall 48 of the front cover 41. The first protrusion 70*a* has a screw insertion hole 74 conforming to the screw hole 73. Likewise, the front wall 48 has a through-hole 75 conforming to the screw insertion hole 74 and the screw hole 73.

Although not shown, the second protrusion 70*b* of the holding member 53 intervenes between the end face of the seat 72*b* and the front wall 48 of the front cover 41. Thus, the second protrusion 70*b* has the screw insertion hole 74 similarly to the first protrusion 70*a*.

The first and second protrusions 70*a* and 70*b* of the holding member 53 are fixed to the seats 72*a* and 72*b* via screws 77 as fixing members, respectively. As the fixed portion of the first protrusion 70*a* is shown as an exemplar in FIG. 7, the screw 77 is screwed into the screw hole 73 of the seat 72*a* through the screw insertion hole 74 of the first protrusion 70*a* from the through-hole 75 of the front wall 48. Thus, the first protrusion 70*a* and the front wall 48 are held between a head 77*a* of the screw 77 and the end face of the seat 72*a*.

Therefore, the first and second protrusions 70*a* and 70*b* of the holding member 53 are fixed to the seats 72*a* and 72*b* of the back cover 39 together with the front cover 41. As a result of this fixing, the touch panel 52 is held on the support wall 42 of the back cover 39, and the body 61 of the holding member 53 contacts the outer peripheral portion of the display surface 51*a* of the liquid crystal display panel 51.

The body 61 of the holding member 53 cooperates with the support wall 42 of the back cover 39 to hold the liquid crystal display panel 51 therebetween. As a result, the liquid crystal display panel 51 and the touch panel 52 are stacked on each other, and in this condition, held on the support wall 42 of the back cover 39. The input region 58 of the touch panel 52 is exposed to the outside of the second housing 37 from the opening 47 of the front cover 41.

According to the second embodiment, the head 77*a* of the screw 77 is covered with a rubber cap 78 that closes the through-hole 75 of the front wall 48.

As shown in FIG. 7, FIG. 11 and FIG. 12, the extension 44 of the antenna cover 40 has first and second receivers 80*a* and 80*b*. The first and second receivers 80*a* and 80*b* are apart from each other in the width direction of the antenna cover 40 at positions adjacent to the first side 62*a* of the holding member 53. The first and second receivers 80*a* and 80*b* have a common configuration. Therefore, the configuration of the first receiver 80*a* is described as an exemplar.

The first receiver 80*a* has first to fifth walls 81*a*, 81*b*, 81*c*, 81*d*, and 81*e*. The first wall 81*a* stands from the inner surface of the extension 44 of the antenna cover 40 toward the front wall 48 of the front cover 41. The first wall 81*a* has a predetermined width dimension along the width direction of the antenna cover 40. The end of the first wall 81*a* faces the end of each of the first and second protrusions 70*a* and 70*b*.

The second wall 81*b* is integrally formed at the end of the first wall 81*a*, and extends from the end of the first wall 81*a* to the touch panel 52. In other words, the second wall 81*b* extends in a direction that intersects with the first wall 81*a*.

The third wall 81*c* is formed integrally with the root of the first wall 81*a*. The third wall 81*c* extends parallel with the second wall 81*b* from the root of the first wall 81*a*, and overlaps the upper edge of the support wall 42 of the back cover 39. The third wall 81*c* faces the second wall 81*b*.

Thus, a clearance 82 is formed between the second wall 81*b* and the third wall 81*c*. The clearance 82 is open toward the touch panel 52. Moreover, the third wall 81*c* cooperates with the first wall 81*a* to configure a corner 83. The corner 83 is exposed in the clearance 82.

The fourth wall 81*d* links the side edge of the first wall 81*a*, the side edge of the second wall 81*b*, and the side edge of the third wall 81*c*. The fourth wall 81*d* closes the clearance 82 from the side of the antenna cover 40, and thereby reinforces the first and second walls 81*a* and 81*b*.

The fifth wall 81*e* links the side edge of the first wall 81*a*, the side edge of the second wall 81*b*, and the side edge of the third wall 81*c* on the opposite side of the fourth wall 81*d*. The fifth wall 81*e* closes the clearance 82 from the opposite side of the fourth wall 81*d*, and thereby reinforces the first and second walls 81*a* and 81*b*. Thus, in the second embodiment, the first to fifth walls 81*a*, 81*b*, 81*c*, 81*d*, and 81*e* cooperate with one another to configure a recess 84 which is open toward the touch panel 52.

Now, a procedure of assembling the display module 33 of the portable computer 31 is described with reference to FIG. 13.

First, the back cover 39 to which the antenna cover 40 is attached is horizontally held so that the inner surface of the support wall 42 of the back cover 39 and the inner surface of the extension 44 of the antenna cover 40 face upward. In this condition, the liquid crystal display panel 51 is placed on the support wall 42 of the back cover 39.

Furthermore, the procedure moves to the work of laying, over the liquid crystal display panel 51, the touch panel 52 to which the holding member 53 is bonded. In this case, an operator tilts the touch panel 52 so that the first and second protrusions 70*a* and 70*b* of the holding member 53 are obliquely downward relative to the liquid crystal display panel 51, and the operator also butts the ends of the first and second protrusions 70*a* and 70*b* against the first and second receivers 80*a* and 80*b* of the antenna cover 40.

Figure 13:
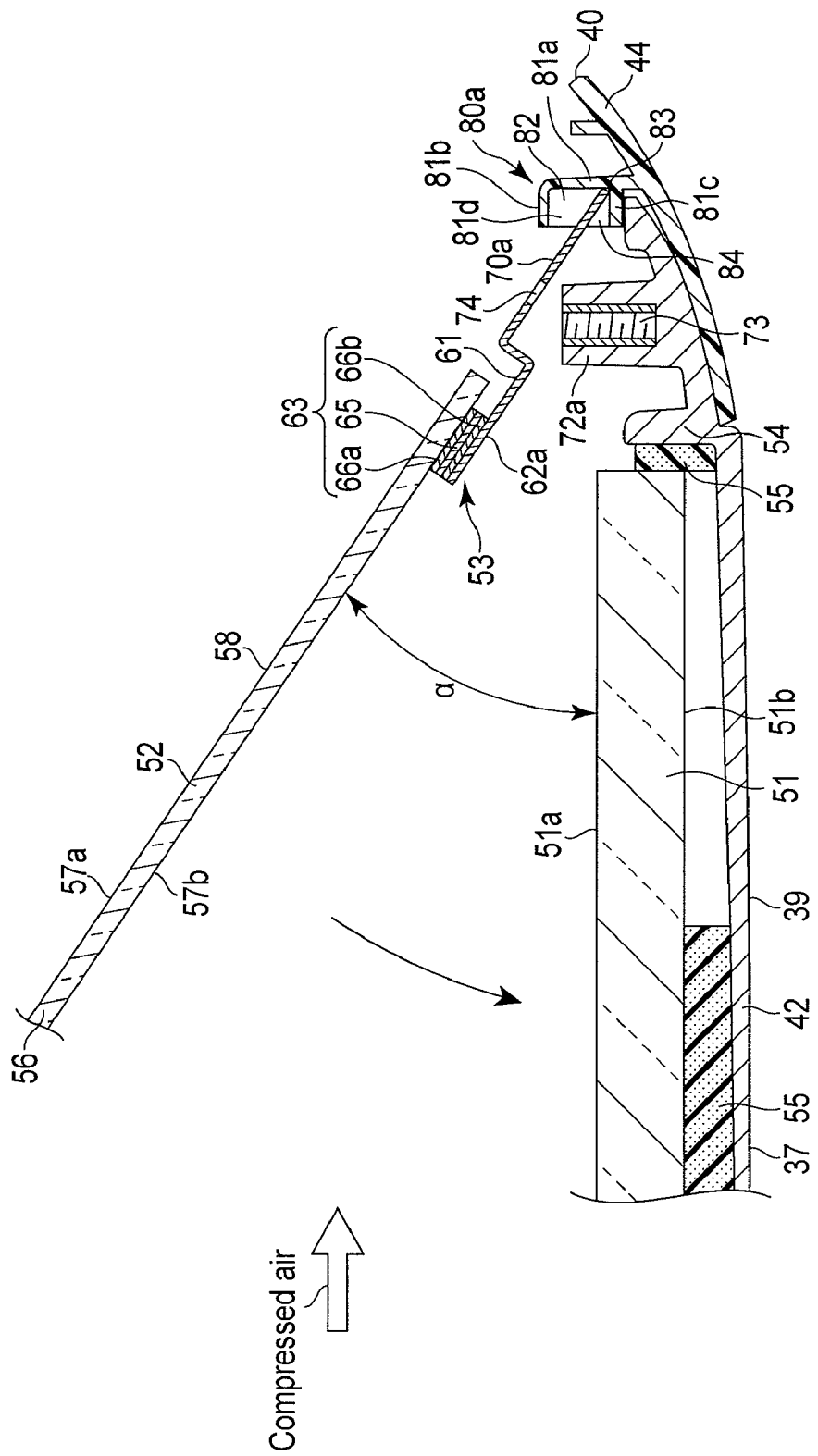
FIG. 13 is an exemplary sectional view showing how the touch panel is tilted relative to the liquid crystal display panel and the end of the protrusion of the holding member is butted against the receiver.

More specifically, as shown in FIG. 8 and FIG. 13, the operator respectively guides the ends of the first and second protrusions 70*a* and 70*b* into the recesses 84 of the first and second receivers 80a and 80b while tilting the touch panel 52 relative to the liquid crystal display panel 51. That is, the operator inserts the end of each of the first and second protrusions 70a and 70b into the clearance 82 between the second wall 81b and the third wall 81c, and thus butts the end of each of the first and second protrusions 70a and 70b against the corner 83 exposed in the clearance 82.

As a result, the first and second protrusions 70a and 70b can be displaced between a first position to be slanted relative to the liquid crystal display panel 51 and a second position to be directed along the liquid crystal display panel 51. Thus, the ends of the first and second protrusions 70a and 70b are butted against the first walls 81a of the first and second receivers 80a and 80b between the first position and the second position. Consequently, the touch panel 52 is temporarily held by the antenna cover 40, and a tilt angle α of the touch panel 52 relative to the antenna cover 40 is determined.

Furthermore, the operator holds the touch panel 52 with one hand to hold the touch panel 52 tilted. The operator also holds an air nozzle with the other hand, and uses the air nozzle to supply compressed air, which is one example of a gas, to a region between the liquid crystal display panel 51 and the touch panel 52. In this case, the tilt angle α of the touch panel 52 is desirably an angle that allows the compressed air to be easily blown to both the liquid crystal display panel 51 and the touch panel 52. By blowing the compressed air to the liquid crystal display panel 51 and the touch panel 52, dust in the air sticking to the liquid crystal display panel 51 and the touch panel 52 is removed.

Furthermore, the operator rotates the touch panel 52 toward the liquid crystal display panel 51 on the ends of the first and second protrusions 70a and 70b butted against the corner 83 of the first and second receivers 80a and 80b while blowing the compressed air to the liquid crystal display panel 51 and the touch panel 52. As a result of this rotation, the touch panel 52 is stacked on the liquid crystal display panel 51 to cover the display surface 51a of the liquid crystal display panel 51.

When the touch panel 52 is stacked on the liquid crystal display panel 51, the first and second protrusions 70a and 70b are located in the second position so that the ends of the first and second protrusions 70a and 70b approach the second walls 81b of the first and second receivers 80a and 80b from below. The second walls 81b inhibit the first and second protrusions 70a and 70b from moving in a direction to separate from the liquid crystal display panel 51 together with the touch panel 52.

Moreover, when the touch panel 52 is stacked on the liquid crystal display panel 51, the first and second protrusions 70a and 70b overlap the end faces of the seats 72a and 72b. At the same time, the screw insertion holes 74 of the first and second protrusions 70a and 70b and the screw holes 73 of the seats 72a and 72b conform to each other.

In this condition, the front cover 41 is laid over the back cover 39, and the through-holes 75 of the front wall 48 are aligned with the screw insertion holes 74 of the first and second protrusions 70a and 70b. Further, the screws 77 are screwed into the screw holes 73 from the through-holes 75 through the screw insertion holes 74. As a result, the front wall 48 of the front cover 41 and the first and second protrusions 70a and 70b are held between the heads 77a of the screws 77 and the end faces of the seats 72a and 72b.

Consequently, the touch panel 52 is held by the support wall 42 of the back cover 39, and the liquid crystal display panel 51 is held between the touch panel 52 and the support wall 42. Moreover, the back cover 39 and the front cover 41 are joined together, such that the work of assembling the display module 33 is completed.

According to the second embodiment, the ends of the first and second protrusions 70a and 70b of the holding member 53 are butted against the first and second receivers 80a and 80b of the antenna cover 40 such that the touch panel 52 is temporarily fastened to the antenna cover 40. Thus, the touch panel 52 can be easily held tilted relative to the liquid crystal display panel 51.

Consequently, even if the compressed air is supplied to the region between the touch panel 52 and the liquid crystal display panel 51 when the touch panel 52 is laid over the liquid crystal display panel 51, it is possible to prevent the touch panel 52 from being lifted or wobbling in response to the pressure of the compressed air.

In addition, when the ends of the first and second protrusions 70a and 70b are butted against the first and second receivers 80a and 80b, the second walls 81b project over the ends of the first and second protrusions 70a and 70b. Therefore, even if the touch panel 52 is lifted by the compressed air, the second walls 81b hold down the ends of the first and second protrusions 70a and 70b, thereby preventing the lifting of the touch panel 52.

Furthermore, according to the second embodiment, the first and second receivers 80a and 80b have the fourth and fifth walls 81d and 81e, respectively. The fourth and fifth walls 81d and 81e cooperate with the first to third walls 81a, 81b, and 81c to configure the recess 84 which is open toward the touch panel 52.

According to this configuration, when the end of each of the first and second protrusions 70a and 70b is guided into the recess 84, the end of each of the first and second protrusions 70a and 70b is held between the fourth wall 81d and the fifth wall 81e from the width direction of the touch panel 52. Thus, when, for example, the ends of the first and second protrusions 70a and 70b are butted against the first and second receivers 80a and 80b, or when the touch panel 52 is rotated, the movement of the first and second protrusions 70a and 70b can be regulated by the fourth and fifth walls 81d and 81e even if the first and second protrusions 70a and 70b shift in the width direction of the touch panel 52.

Therefore, the posture of the touch panel 52 is stabilized, and the work of blowing the compressed air to the touch panel 52 and the liquid crystal display panel 51 can be easily carried out.

In addition, the engaging strips 68 folded from the first side 62a, the second side 62b, and the fourth side 62d of the holding member 53 toward the liquid crystal display panel 51 are arranged to be spaced from one another. That is, the adjacent engaging strips 68 are separate from each other, so that the compressed air supplied to the space between the touch panel 52 and the liquid crystal display panel 51 exits from the space between the touch panel 52 and the liquid crystal display panel 51 through the engaging strips 68.

Thus, the way to let out the compressed air can be secured even if the space between the touch panel 52 and the liquid crystal display panel 51 is reduced by the rotation of the touch panel 52. As a result, the touch panel 52 subjected to the pressure of the compressed air is not easily lifted.

Furthermore, the ends of the first and second protrusions 70a and 70b butted against the first and second receivers 80a and 80b serve as pivots on which the touch panel 52 is rotated toward the liquid crystal display panel 51. Thus, the touch panel 52 can be rotated on a stable track without wobbling.

Consequently, the work of laying the touch panel 52 over the liquid crystal display panel 51 while blowing dust with the compressed air can be easily carried out. This improves the workability in assembling the display module 33.

The first and second protrusions are not exclusively formed in the holding member bonded to the touch panel. For example, a protrusion protruding to the periphery of the liquid crystal display panel may be formed in one edge of the touch panel, and the end of the protrusion of the touch panel may be butted against the receiver.

In addition, a screw insertion hole which allows a screw to pass through may be formed in the protrusion of the touch panel, and the touch panel may be directly fixed to the back cover or the antenna cover.

Moreover, according to the second embodiment, the first and second protrusions of the holding member are fixed to the seats of the antenna cover. However, the second embodiment is not limited to this. For example, fixing pieces projecting to the periphery of the touch panel may be provided at positions of the holding member off the first and second protrusions, and these fixing pieces may be fixed to the antenna cover or the back cover by screws.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a first panel which comprises a display surface;
   a second panel laid over the first panel to cover the display surface of the first panel;
   a holding member provided in the second panel, the holding member comprising a protrusion protruding to the periphery of the second panel;
   a housing which comprises a cover to which the protrusion of the holding member is fixed; and
   a receiver provided in the housing, the receiver comprising a wall portion configured to receive the end of the protrusion while tilting the second panel towards the first panel, a pair of wall parts facing each other while interposing the protrusion therebetween and a wall section which covers the end from an opposite side of the cover at a position apart from the end of the protrusion when the protrusion is fixed to the cover,
   wherein the second panel is rotated towards the first panel around the end of the protrusion received by the wall portion to fix the protrusion to the cover, thereby making the second panel cover the display panel of the first panel.

2. An electronic apparatus comprising:
   a first panel;
   a second panel superposed on the first panel;
   a protrusion protruding to the periphery of the second panel;
   a housing which comprises a cover to which the protrusion is fixed;
   a wall portion provided in the housing and comprising a portion serving as a fulcrum around which the second panel is rotated towards the first panel, the wall portion being configured such that the protrusion butts thereto while the second panel being tilted towards the first panel;
   wall parts provided in the housing, the wall parts being configured to cover the protrusion from at least two directions which normally cross a direction in which the second panel is stacked on the first panel; and
   a wall section provided in the housing, the wall section covering the protrusion from an opposite side of the cover, and being apart from the protrusion while the protrusion being fixed to the cover.

3. The electronic apparatus of claim 2, wherein the second panel comprises long sides and short sides and the protrusion is provided at a position corresponding to the long side.

4. The electronic apparatus of claim 3, wherein the protrusion is provided on only one of the long sides of the second panel.

5. The electronic apparatus of claim 1, wherein the second panel comprises long sides and short sides, the wall portion configured to receive the end of the protrusion faces the end of the protrusion from a direction along the short sides of the second panel, and the wall parts interposing the protrusion therebetween face the end of the protrusion from a direction along the long sides of the second panel.

6. The electronic apparatus of claim 1, wherein the receiver comprises a corner to which the end of the protrusion butts when the second panel is rotated towards the first panel.

\* \* \* \* \*